(12) United States Patent
Selen et al.

(10) Patent No.: US 8,270,906 B2
(45) Date of Patent: Sep. 18, 2012

(54) METHOD AND APPARATUS RELATING TO SPECTRUM SENSING

(75) Inventors: Yngve Selen, Uppsala (SE); Jonas Kronander, Uppsala (SE); Hugo Tullberg, Nykoping (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 127 days.

(21) Appl. No.: 12/993,555

(22) PCT Filed: Jun. 4, 2009

(86) PCT No.: PCT/SE2009/050673
§ 371 (c)(1),
(2), (4) Date: Nov. 19, 2010

(87) PCT Pub. No.: WO2009/148401
PCT Pub. Date: Dec. 10, 2009

(65) Prior Publication Data
US 2011/0076959 A1 Mar. 31, 2011

Related U.S. Application Data

(60) Provisional application No. 61/058,668, filed on Jun. 4, 2008.

(51) Int. Cl.
*H04B 17/00* (2006.01)
(52) U.S. Cl. .................. 455/67.11; 455/404.2; 455/423
(58) Field of Classification Search ............... 455/67.11, 455/404.2, 423, 446, 448, 456.1
See application file for complete search history.

(56) References Cited

U.S. PATENT DOCUMENTS
7,184,777 B2 * 2/2007 Diener et al. ............ 455/456.1

OTHER PUBLICATIONS

Zhang et al. ("Cooperative Spectrum Sensing Optimization in Cognitive Radio Networks," Communications, 2008. ICC '08. IEEE International Conference, pp. 3411-3415, May 2008).*
Zhang, W. et al. "Cooperative Spectrum Sensing Optimization in Cognitive Radio Networks", Communications, 2008, ICC '08, IEEE International Conference, May 2008, pp. 3411-3415.

(Continued)

*Primary Examiner* — Tuan H Nguyen
(74) *Attorney, Agent, or Firm* — Rothwell, Figg, Ernst & Manbeck, P.C.

(57) ABSTRACT

The invention comprises a method and a corresponding apparatus (53). A candidate set of sensors that are available to participate in an occasion of cooperative spectrum sensing is obtained. For each sensor in the candidate set, its radial distance to a central coordinating node in a communication system is also obtained (73). A sequence of minimum radii is produced (75,79). For each minimum radius in the sequence, an accommodation number is determined (75,87). The accommodation number associated with a minimum radius is the greatest number of sensors that can be placed on circle having this radius without a probability that all these sensors are mutually uncorrelated falling below a design probability threshold. Sensors from the candidate set are then selectively added (91,95) to an active set of sensors based on the minimum radii, the corresponding accommodation numbers and the obtained radial distances.

13 Claims, 5 Drawing Sheets

OTHER PUBLICATIONS

Peh, E., et al., "Optimization for Cooperative Sensing in Cognitive Radio Networks", Wireless Communications and Networking Conference, 2007, WCNC 2007, IEEE, Mar. 11-15, 2007, pp. 27-32.

Ghasemi, A., et al., "Opportunistic Spectrum Access in Fading Channels Through Collaborative Sensing", Journal of Communications, vol. 2, No. 2, Mar. 2007, pp. 71-82.

Mishra, S.M., et al., "Cooperative Sensing Among Cognitive Radios", Communications 2006, ICC '06, IEEE International Conference, vol. 4, Jun. 2006, pp. 1658-1664.

Cabric D., et al., "Implementation Issues in Spectrum Sensing for Cognitive Radios", Signals, Systems and Computers, 2004, Conference Record of the Thirty-Eighth Asilomar Conference, vol. 1, Nov. 7-10, 2004, pp. 772-776.

Cabric D., et al., "Spectrum Sensing Measurements of Pilot, Energy, and Collaborative Detection", Military Communications Conference, 2006, MILCOM 2006, IEEE, Section IV, Oct. 23-25, 2006, pp. 1-7.

* cited by examiner

METHOD AND APPARATUS RELATING TO SPECTRUM SENSING

CROSS-REFERENCE TO RELATED APPLICATIONS

This application is a 35 U.S.C. §371 National Phase Entry Application from PCT/SE2009/050673, filed Jun. 4, 2009, and designating the United States, and claims priority to provisional application Ser. No. 61/058,668, filed Jun. 4, 2008, the contents of which are incorporated herein by reference.

TECHNICAL FIELD

The present invention pertains to the field of radio communications, and in particular to the part of this field where spectrum utilisation is based on cooperative spectrum sensing.

BACKGROUND

Recent research has shown that usage of the radio spectrum is often fairly inefficient. One key factor in this is the current spectrum licensing system. That is, some part of the radio spectrum is licensed to a party, such as an operator of a radio communications system, who is given an exclusive right to use this part of the radio spectrum. For example, even though significant parts of the useful spectrum is licensed, several measurements (see, e.g. T. Erpek, K. Steadman, D. Jones, "Spectrum Occupancy Measurements: Dublin, Ireland, Collected On Apr. 16-18, 2007", Shared Spectrum Company Report, 2007) indicate that some parts of this spectrum are highly underutilized. Therefore, a more flexible use of the radio spectrum has become a research intensive subject within which the aim is at optimizing, i.e. maximizing, the usage of the available radio spectrum. One approach pursued in regulations has been to license spectrum to a licensee (primary user), while at the same time allowing the licensed frequency band to be used by other users (secondary users) under the condition that they do not introduce harmful interference to the system operation of the primary user. Another approach under discussion is to have completely unlicensed spectrum, which has to be shared with equal right among many users.

New notions and terminologies have been developed in the effort to introduce a more flexible and efficient use of the radio spectrum.

One new term is Dynamic Spectrum Access, which describes spectrum access where radio units are not limited to using only a specific spectrum band (such as their licensed spectrum), but rather adapt the spectrum they use depending on conditions such as estimated throughput and latency requirements, spectrum availability etc. For instance, a cellular system suffering from high load in its own licensed spectrum could dynamically access spectral bands owned by some other licensee to temporarily increase its throughput, as long as it does not cause unacceptable interference to the primary system, or a network of communicating nodes may change its operating frequency depending on current spectral conditions. Potentially, dynamic spectrum access can enable more efficient use of the limited resource that radio spectrum is. This is because several systems then share the same resources such that when one system requires only a small amount of spectrum, other systems experiencing higher loads can utilize a greater bandwidth.

Another important notion is spectrum-on-demand, which means that radio nodes only operate as unlicensed (or secondary) users in a spectral band when triggered to do so. One reason for the radio nodes to initiate communication over unlicensed frequency bands could be that a licensed frequency band (if any) can not fulfill desired needs. Such events may occur, e.g., during peak hours at central stations, during special events such as concerts or sport events, or when several users in the same cell each demand a high bandwidth.

The spectrum-on-demand scenario usually looks slightly different depending upon the structure of the network, which may be both centralized and decentralized (autonomous).

A centralized network has a main (or central) node which has a controlling function over the network. Examples of centralized networks are the common cellular networks employed today for mobile communication, in which the main node (typically a base station (BS)) handles all communication with other nodes (user equipments UEs)) within a cell. Another example of a centralized network is an ad hoc network in which a master node (a function which may be given and handed over to any node in the network) has a regulating function over the other nodes.

In a decentralized network, all nodes are essentially equal (i.e. no node can control the operation of another node) and operate and communicate autonomously. Spectrum use is performed according to predetermined rules, or etiquette. If a node experiences an increased bandwidth demand, it can increase its use of a shared spectrum, if neighbouring nodes accept this, e.g., if they are willing to reduce their spectrum use. Alternatively the node can try to detect and access spectrum unused by the system (which does not necessarily have to be shared with the other nodes) to meet the demand.

A concept, which relates to both centralized and decentralized networks (as well as to Dynamic Spectrum Access in general), is so-called spectrum sensing (sensing hereinafter). Sensing is the act of determining, by monitoring radio transmissions, whether e.g. a particular spectrum band is currently at least in part free for use. That is, sensing is a way of finding spectrum opportunities, which may be accessed in a dynamic, and possibly secondary, manner. A device which takes part in the sensing is usually referred to as a sensor. Various network nodes, such as user equipments and base stations, may act as sensors. Since spectrum opportunities which are identified by sensing can be viewed as less reliable than spectrum specifically licensed for the system, these opportunities may, e.g., be used for transmissions that are considered to be non time-critical.

It has been shown, e.g. in A. Ghasemi, E. S. Sousa, "Opportunistic Spectrum Access in Fading Channels Through Collaborative Sensing," Journal of Communications, vol. 2, no. 2, pp. 71-82, March 2007, that several sensors which experience, at least to some extent, uncorrelated fading (with respect to the possible signals to which the sensing is applied) are required for high reliability of the sensing result. This is because a single sensor may be in a deep fade, which makes it virtually impossible, or at least very difficult, to detect a current usage of spectrum resources. Therefore, it is often advocated that sensing should be performed in a cooperative manner involving a plurality of sensors.

Current research has been mainly focused on providing methods for detecting spectrum opportunities using cooperative sensing. Very little, however, has been done on how to select the sensors that will participate in the cooperative sensing. The concept of "distance spread" is treated in S. M. Mishra, A. Sahai, R. W. Brodersen, "Cooperative Sensing among Cognitive Radios", IEEE Intl. Conf. on Communication, Vol. 4, June 2006 pp. 1658-1663. There, sensing performance with respect to the number of sensors involved in cooperative sensing and the distance between the farthest sensors on a straight line is treated. The article shows that once a certain number of sensors are participating in the cooperative sensing, adding more sensors only improves the sensing performance marginally. A drawback with the study, however, is that the geometry is mainly limited to a straight line.

A sensor performing spectrum sensing will deplete overall system resources. For example, the sensor will use power for its receiver and baseband circuitry and may thus reduce a battery life-time, and the sensing process will consume processing capacity. Also, a sensor normally needs to report its sensing result somehow, which requires additional communication resources. It is therefore desirable to use few sensors in the sensing, while still having a sufficient number such that the sensing is reliable. In this sense, the number of sensors to use is a trade-off between having a high reliability of the sensing result, and having a low or reasonable demand on resources, such as battery capacity of the partaking sensors, and transmission overhead in the communication system. Consequently, there exists a need to be able to select the sensors that participate in the cooperate sensing in an "optimal" manner which suitably balances these conflicting aspects.

One object of the present invention is therefore to overcome or at least mitigate at least one of the above-indicated difficulties.

SUMMARY

According to one aspect of the present invention, the above-stated object is achieved with a method according to the following. A candidate set of sensors that are available to participate in an occasion of cooperative spectrum sensing is obtained. For each sensor in the candidate set, its radial distance to a central coordinating node in a communication system is also obtained. A sequence of minimum radii is produced. For each minimum radius in the sequence, the number of sensors that can be accommodated at that radius is determined. That is, this number is the greatest number of sensors that can be placed on circle having this radius without a probability that all these sensors are mutually uncorrelated falling below a first design probability threshold. The first minimum radius is set to zero, and the corresponding number of sensors that can be accommodated at this minimum radius is set to one. The central coordinating node is selected to an active set of sensors that are to participate in the cooperative spectrum sensing. Each one of the other minimum radii is calculated based on the previous minimum radius in the sequence and the number of sensors that can be accommodated at this previous minimum radius. This is done by calculating the minimum radius such that an estimated probability of a sensor at this minimum radius being correlated with any sensor that could be accommodated at the previous minimum radius in the sequence is equal to a second design probability threshold. A calculated minimum radius is also checked against one or more constraints. If the calculated minimum radius does not fulfil the one or more constraints, the minimum radius is recalculated such that the one or more constraints are fulfilled. Sensors are now selected to the active set from the candidate set based on the sequence of minimum radii and the corresponding accommodation numbers. For a particular minimum radius this entails the following. If the candidate set includes a number, which is equal to or greater than the number of sensors that can be accommodated at that particular minimum radius, of sensors which all have radial distances to the central coordinating node that exceed this particular minimum radius, then a number, equal to the number of sensors that can be accommodated at this minimum radius, of sensors which have the smallest radial distances to the central coordinating node that still exceed the particular minimum radius are selected from the candidate set to the active set. If, however, the number of sensors in the candidate set, which have radii to the central coordinating node that are greater than the particular minimum radius, are fewer than the accommodation number, then all sensors in the active set, if any, with radii greater than the particular minimum radius are selected to the active set, and the selection procedure terminates.

According to another aspect of the present invention, the above-stated object is achieved with an element for sensors selection which is configured to perform the above method.

One advantage with embodiments of the present invention is that efficient and systematic approaches to sensor selection for cooperative spectrum sensing are provided. By not necessarily involving every candidate sensor in cooperate spectrum sensing, a strain on system resources introduced by cooperate spectrum sensing can be kept at an acceptably low level. Furthermore, the systematic selection of sensors to the active set suggested above, assures that cooperate sensing still becomes fairly reliable.

Another advantage is that embodiments of the invention only need to use radial distances to the central coordinating node, rather than more complete positioning information. Such radial distances are fairly easy to obtain in most systems. Using radial distance information, it is of course possible to identify sensors which are guaranteed to be uncorrelated, i.e. the distances between sensors are greater than a predetermined decorrelation distance. However, the number of sensors that can be found in this way is usually fairly small, so cooperative spectrum sensing is then likely to become unreliable for this reason. With the probabilistic approach suggested by embodiments of the present invention, many more sensors become eligible for selection, while still not having to select all sensors in the candidate set to the active set in order to achieve a suitable degree of reliability in the cooperative spectrum sensing.

The invention will now be described further using exemplary embodiments and referring to the drawings. A person skilled in the art will appreciate that further objects and advantages may be associated with these exemplary embodiments of the invention.

Modifications and other embodiments of the disclosed invention will come to mind to one skilled in the art having the benefit of the teachings presented in the following descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

DETAILED DESCRIPTION

Figure 1:
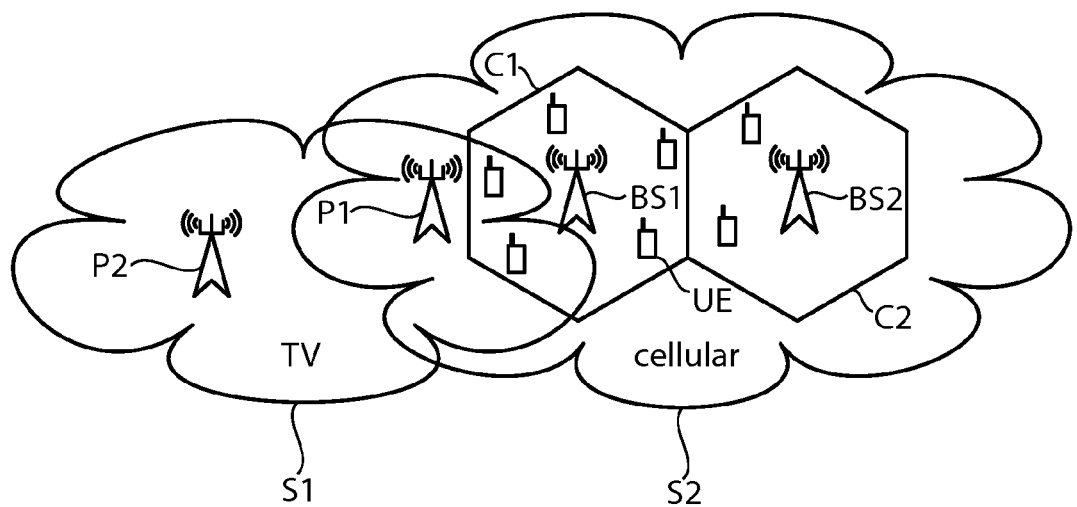
FIG. 1 is a schematic network diagram illustrating an exemplary spectrum-on-demand situation where embodiments of the invention may be applied.

FIG. 1 is schematic network diagram illustrating one, purely exemplary, spectrum-on-demand situation where embodiments of the present invention may be applied. In the figure, there are two radio communication systems S1 and S2 with intersecting coverage areas. Here, by way of example, the system S1 is a television broadcasting system, symbolically represented by two broadcasting antennas P1 and P2; and the system S2 is a cellular radio communication system, symbolically represented by two base stations BS1 and BS2, which provide radio coverage in cells C1 and C2, respectively. A number of user equipments (UE) serviced by the system S2 are also shown. The system S1 has a license for a spectrum band B1. However, the system S2, which has a license to another spectrum band B2, also wants to be able to exploit spectrum opportunities in the spectrum band B1. Consequently, the system S2 thus has a reliable spectrum band B2 in which it can schedule control signalling as well as data and other forms of communication. At the same time, if required or desired, it has the option to temporarily extend its available spectrum by using the less reliable spectrum band B1 as a secondary user. As long as a system load in the system S2 is low relative to the bandwidth of the spectrum band B2, it is probably not necessary for the system S2 to use resources in the spectrum band B1. However, when the load of the system S2 becomes high, the spectrum band B1 can be used by the system S2 for, e.g., (but not limited to) non time-critical transmissions, such as large file transfers and the like. Therefore, the system S2 needs to develop an awareness of the spectrum opportunities existing in the spectrum band B1, that is, radio resources (e.g. time/frequency resources or codes) in the spectrum band B1 which are currently not used by the system S1, or by any other system operating as secondary user in the spectrum band B1. Here, it is assumed that the system S1 does not directly supply the system S2 with information on spectrum opportunities in the spectrum band B1. The system S2 therefore has to detect the opportunities itself by means of sensing. If the system S2, after having performed sensing, is confident that there are resources in the spectrum band B1 which are not being used, the system S2 may choose to use those resources for its own traffic.

Figure 2:
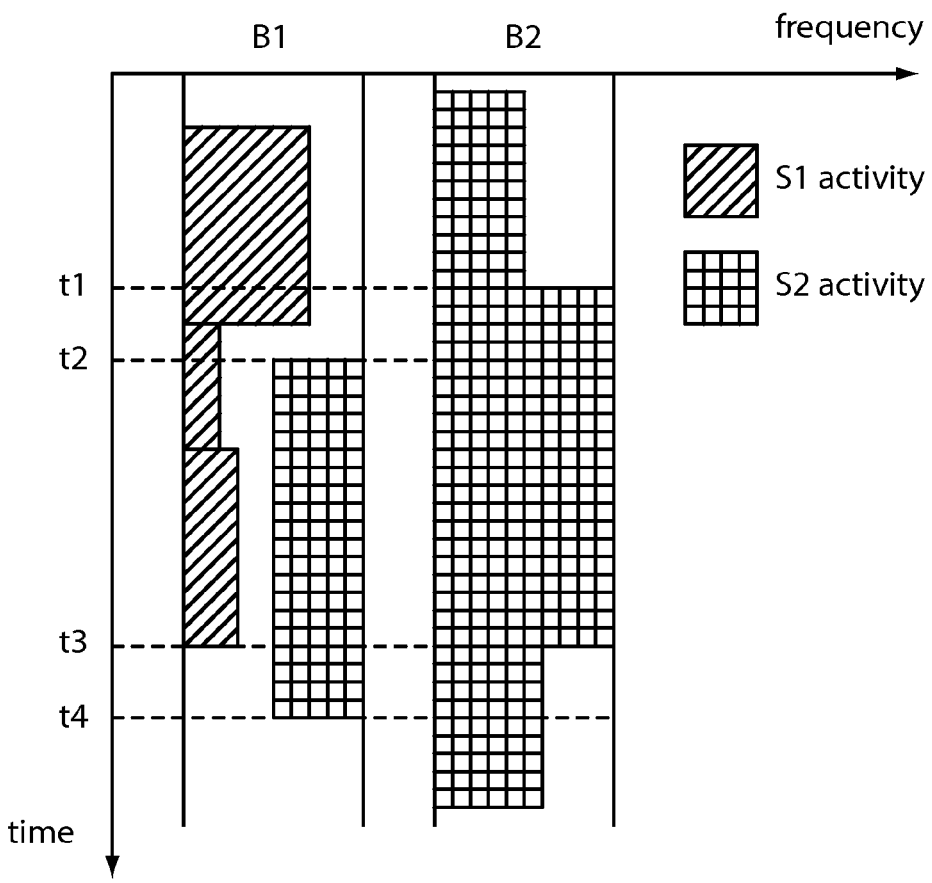
FIG. 2 is a frequency-time diagram illustrating spectrum-on-demand operation in the network situation illustrated in FIG. 1.

FIG. 2 is a frequency-time diagram that provides an example of spectrum-on-demand operation applied to the network situation of FIG. 1. At a time t1, the system S2 experiences an increased spectrum demand when its licensed spectrum band B1 becomes fully utilized. The system S2 starts to sense the band B1 in search for spectrum opportunities. At a time t2, system S2 has detected a spectrum opportunity and starts to use part of the spectrum band B1 in a secondary manner. At a time t3, the spectrum demand in the system S2 decreases but S2 still utilizes resources in B1. At a time t4, the spectrum demand decreases further and the system S2 abandons the spectrum band B1.

The sensing in the system S2 is preferably performed in a cooperative manner involving a plurality of sensors, in order to improve the sensing reliability. The nodes of the system S2, such as base stations and/or serviced user equipments, may act sensors.

Figure 3:
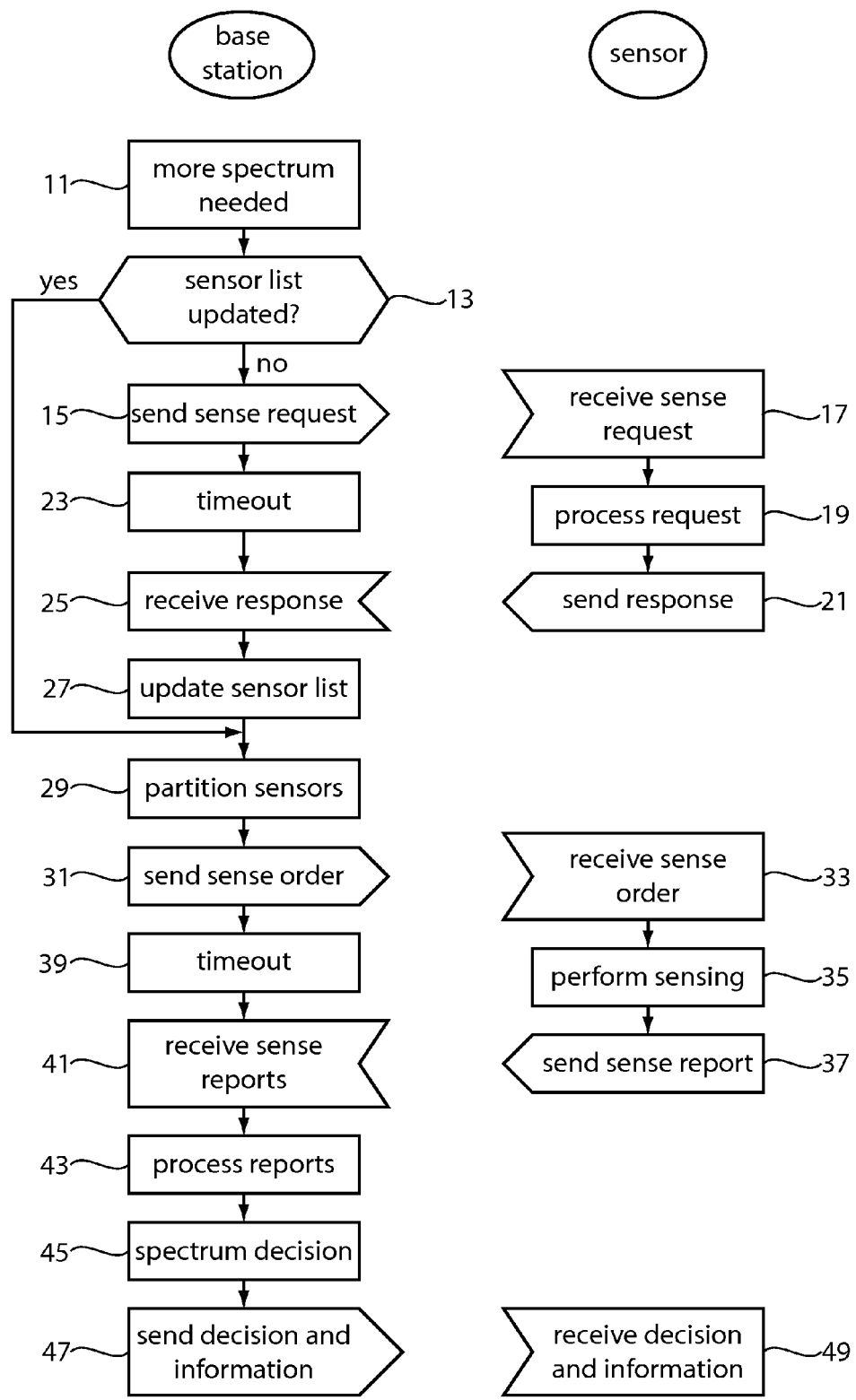
FIG. 3 is a flow chart illustrating a cooperative spectrum sensing operation according to an embodiment of the invention.

FIG. 3 is a flow chart that illustrates one example of cooperative sensing in accordance with an embodiment of the invention. The left side of FIG. 3 illustrates actions performed in a base station, which here act as an initiating and coordinating node for the cooperative spectrum sensing. The right side of FIG. 3 illustrates actions performed in one exemplary sensor. At a block 11, the base station determines that more spectrum is needed in order to support the communication demand. The base station maintains a list of sensors that can be seen as candidates for participation in cooperative sensing. This list thus contains a candidate set of sensors. Such a candidate set is a subset of a "total set", that is, all nodes in some geographical area. In embodiments, such as the one in FIG. 3, where selection of sensors for cooperative sensing is coordinated by a central node (e.g. a base station in a cellular system or a master node in an ad hoc network) the total set can be all nodes associated with that central node. Reasons why a particular node is not a member of the candidate set are permanent factors, e.g., the node may lack the necessary functionalities, such as support of the spectrum band to be sensed, and/or temporary factors, e.g., the battery level of the node is too low to participate. After the block 11, the base station determines, at a block 13, whether the list is up to date. If the list is not up to date, the base station sends a sense request to all nodes associated the base station at a block 15. This sense request is then received by the sensors, illustrated by the exemplary sensor at a block 17. The exemplary sensor processes the sense request at a block 19 to determine whether it is currently a candidate for participation in cooperative spectrum sensing. In this particular example, it is assumed that the exemplary sensor is a candidate for cooperative spectrum sensing, and this fact is communicated to the base station in a response at a block 21. After a timeout 23 (meaning a time which the base station has to wait), the base station receives this response, and possibly similar responses from other nodes, at a block 25. Based on the received responses, the base station updates the sensor list at a block 27. When the base station has a sensor list that is up to date, the base stations partitions the candidate set into two sets, one active set and one passive set. The active set contains the sensors that will participate in the cooperative sensing at this particular time, and the passive set contains the sensors in the candidate set that will not participate in the cooperative sensing at this particular time. It, of course, suffices to determine one of these sets, e.g. the active set. The other set is then implicitly determined as well. Having established the active set, the base station sends, at a block 31, a sense order that orders all sensors in the active set to perform sensing. In this example it is assumed that the exemplary sensor is in the active set, and the exemplary sensor receives the sense order at a block 33. In response to the sense order, the exemplary sensor performs sensing at a block 35. After the sensing has been performed, the exemplary sensor sends a result of the sensing in a sense report to the base station at a block 37. After a timeout 39 (i.e., a waiting period), the base station receives this sense report, and similar sense reports from other sensors in the active set, at a block 41, and the received sense reports are then processed by the base station at a block 43. The processing of the sense reports results in a spectrum decision at a block 45. The spectrum decision establishes whether or not one or more spectrum opportunities have been detected as a result of the cooperative spectrum sensing. At a block 47, the base station transmits the spectrum decision and possibly additional information to relevant system nodes (e.g., nodes which are scheduled for transmission or reception in the detected spectrum opportunities). In this particular example, the exemplary node receives this transmission at a block 49.

There are several reasons for the above-mentioned partitioning of the candidate set. One reason for not wanting all sensors to participate in the sensing activity is to reduce the energy consumption in the system. This is particularly important for battery powered sensors: repeated participation of one and the same sensor in the cooperative sensing will drain the battery of that sensor. It can also be shown that it is usually more important in cooperative sensing to have a large geographical spread of the sensors than having many sensors that experience correlated fading. The reason for this is that the probability of correlated shadow fading generally decreases with the sensor separation.

To reduce the power consumption in individual nodes, the partitioning of the candidate set into the active set and the passive set is allowed vary over time.

Furthermore, if a spectrum range to sense is divided into sub-ranges, there can be a separate active set for each frequency sub-range to sense.

Figure 4:
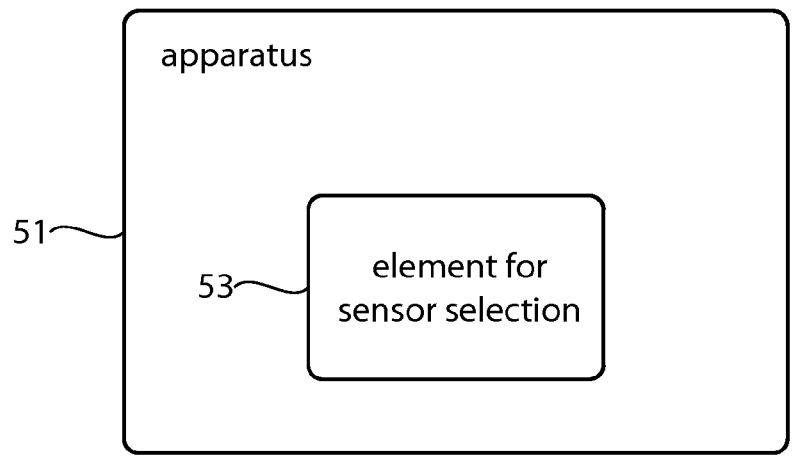
FIG. 4 is a block diagram illustrating an apparatus with an element for sensor selection according to an embodiment of the invention.
Figure 5:
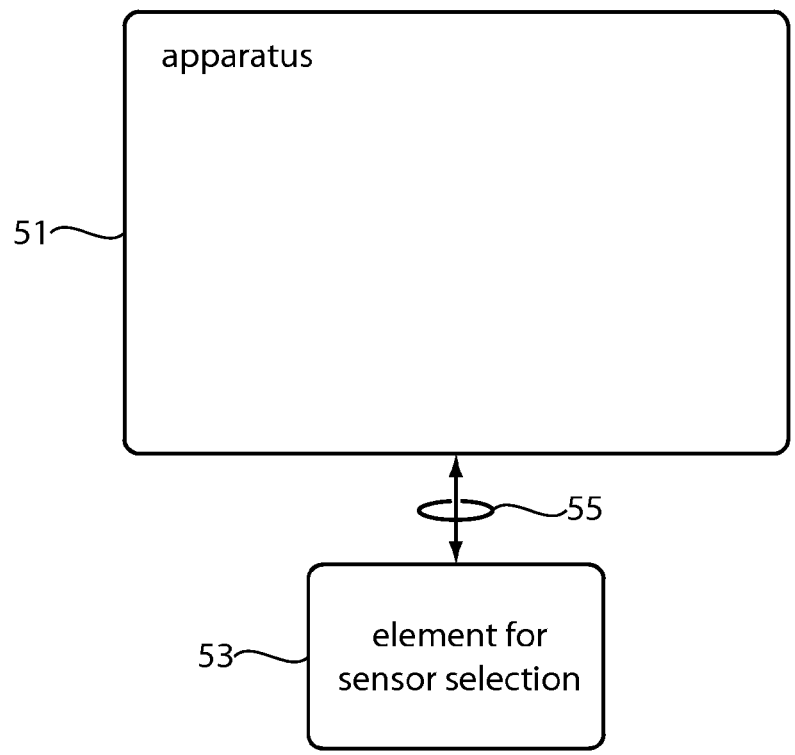
FIG. 5 is a block diagram illustrating an apparatus connected to an element for sensor selection according to an embodiment of the invention.

In the example of FIG. 3, the base station is responsible for partitioning the candidate set into the active set and the passive set, thereby in effect determining the sensors that should participate in the cooperative sensing. Of course, any apparatus, not necessarily a base station, which has access to an element for sensor selection can be made responsible for this partitioning of the candidate set. FIG. 4 is a schematic block diagram illustrating one example of such an apparatus 51. Here, an element for sensor selection 53 is provided and contained in apparatus 51. A similar block diagram is shown in FIG. 5.

Here, however, the element for sensor selection 53 and the apparatus 51 are physically distinct units that communicate through a communication channel 55. The element for sensor selection 53 can be implemented in various ways employing standard circuit technologies, such as application specific circuitry, programmable circuitry, or any combination thereof. The person skilled in the art will appreciate that the element 53 may also fully or partly be implemented with one or more processors programmed with suitable software. The element for sensor selection can also be a single unit, or the sensor selection functionality can be distributed over several units, e.g., several processors in a device, or several communicating devices.

Figure 8:
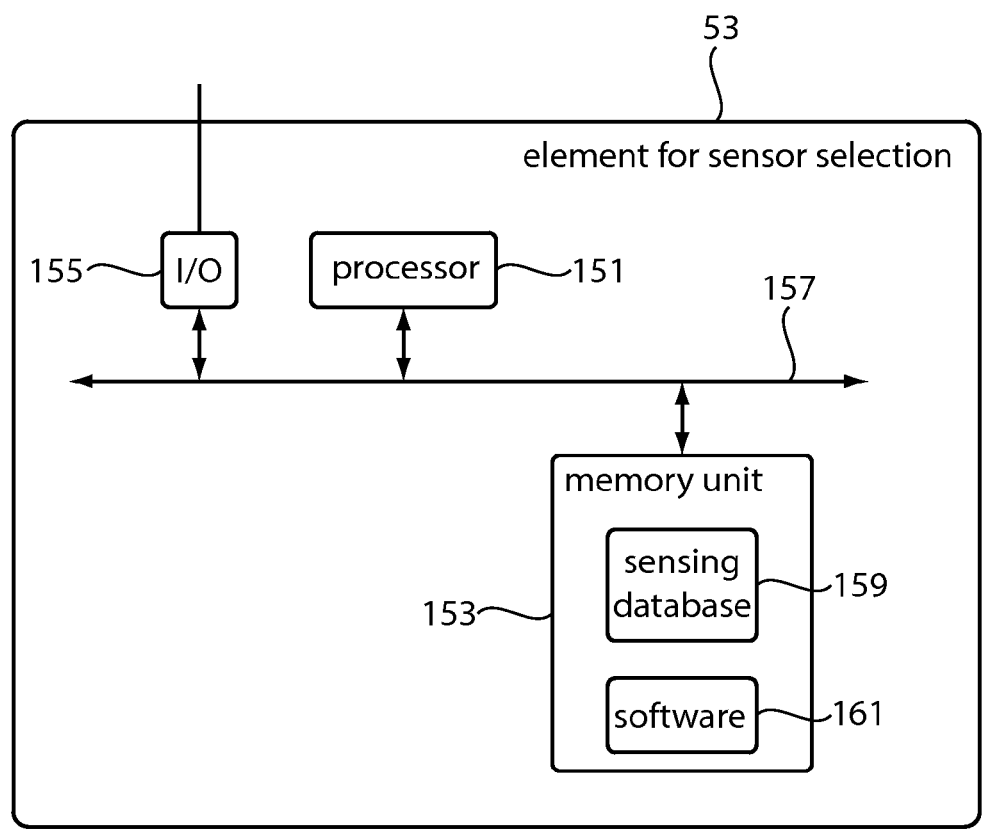
FIG. 8 is a block diagram illustrating an element for sensor selection according to an implementation embodiment of the invention.

FIG. 8 is block diagram that illustrates a particular implementation embodiment of the element for sensor selection 53. In the embodiment of FIG. 10, the element for sensor selection 53 comprises a processor 151, a memory unit 153, and an input-output unit 155, which are all operationally connected, e.g. by means of a digital bus 157. The memory unit 153 stores a database 159 with information relevant to the selection process. The database 159 includes information, which may initially have been received via the input-output unit 155, identifying the candidate set and other information relating to the candidate set, such as, for example, positioning information. The database 159 may also contain pre-stored data that can be used in the selection process, as will be exemplified below. The processor performs the selection process using software 161 and data that are provided by the memory unit 153 or via the input-output unit 155. A result of the selection process may be communicated via the input-output unit 155.

The element for sensor selection 53 may in particular be configured to perform any one of the methods described and indicated below.

Shadow fading arises from propagation loss behind large structures such as buildings and mountains. The shadowing is spatially correlated and one model of the correlation, which is a function of distance d between two terminals, R(d), is $$R(d)=e^{-ad}, \quad (1)$$

where a is an environment parameter. In urban environments a≈0.1204, e.g., and in suburban environments a≈0.002, e.g., provided d is given in meters, see A. Ghasemi, E. S. Sousa, "Opportunistic Spectrum Access in Fading Channels Through Collaborative Sensing," Journal of Communications, vol. 2, no. 2, pp. 71-82, March 2007. Since the correlation is modelled by an exponential decay, it can not be negative and it approaches zero in the limit (i.e. when d→infinity). The propagation environment can be characterized by a decorrelation distance, $d_0$, which is a minimum separation between sensors required for a shadowing correlation to fall below a pre-determined threshold. This threshold can be selected as a user parameter. Essentially, it represents a tradeoff between the amount of sensors selectable, if "uncorrelated" sensors are desired, and the correlation level of the selected sensors. The decorrelation distance $d_0$ can be obtained from the equation above, for a given correlation threshold. In the following we will use the term uncorrelated shadowing for shadowing correlation below the threshold, i.e., when the separation of the two sensors is larger than $d_0$. The sensors are then said to be "uncorrelated", otherwise the sensors are said to be "correlated".

According to embodiments of the invention it is assumed that only radius information is available, i.e., the distances from the coordinating node to the other available sensors in the candidate set. This distance information can be obtained from propagation times, timing advance, or similar features. Strictly speaking, this gives the distances the electromagnetic waves have travelled, rather than the physical distances. However, the differences are usually small and it is not unlikely that insufficient timing resolution in a receiver will cause larger errors than the difference between physical distance and propagation distance.

Figure 6:
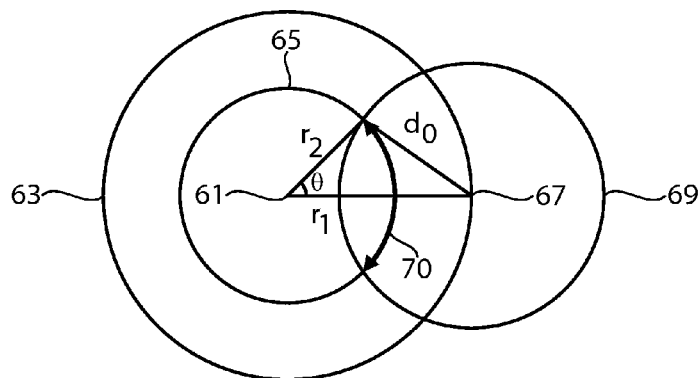
FIG. 6 is a geometric diagram.

First a probability that two sensors at distances r1 and r2 from a coordinating node experience correlated shadowing is derived. FIG. 6 is a geometric diagram that illustrates this situation. A central coordinating node, such as a base station, master node or similar, is here located at a point 61, and two circles 63 and 65 centred at the point 61 are drawn. The circles 63 and 65 have radii r1 and r2, respectively. Without loss of generality, it has been assumed in FIG. 6 that r1 is greater than r2. Note, in particular, that the formulas that will be presented apply also when r2 is equal to or greater than r1. One sensor is assumed to be located on the circle 63 at an arbitrary point 67. A probability P[corr(1)] that this sensor is correlated with a sensor located on the circle 65 will now be established. For the sensors to experience uncorrelated shadowing a distance between them must be greater than the decorrelation distance d0. There are three cases, depending on the values of r1, r2 and d0. The first two cases are fairly simple (they are both straightforward consequences of the triangle inequality): if d0<abs(r1−r2), then the probability of correlated shadowing is zero; if d0≧r1+r2, then the probability of correlated shadowing is one. FIG. 6 is, however, intended to illustrate the third case, where neither one of the above inequalities hold. Here, a third circle 69, centred at the point 67 and having a radius d0, is drawn. Clearly, any sensor located on or within the circle 69 will be correlated with the sensor at the point 67, and when a restriction is made to the circle 65, this means any sensor on an indicated circle segment 70. Using, for example, the law of cosines it can be shown that a length s of the circle segment 70 is $$s(r_1, r_2, d_0) = 2r_2\theta = 2r_2 \cos^{-1}\left(\frac{r_1^2 + r_2^2 - d_0^2}{2r_1 r_2}\right).$$

Assuming a uniform angular probability distribution of the sensors, a probability that the sensor at the point 67 is correlated with a particular sensor on the circle 65 is simply a ratio between the length s of the circle segment 70 and a total length of the circle 65, that is, $$P[\text{corr}(1)] = \frac{s(r_1, r_2, d_0)}{2\pi r_2}.$$

So that in general $$P[\text{corr}(1)] = \begin{cases} 0 & \text{when } d_0 < \text{abs}(r_1 - r_2) \\ 1 & \text{when } d_0 \geq r_1 + r_2 \\ \frac{1}{\pi}\cos^{-1}\left(\frac{r_1^2 + r_2^2 - d_0^2}{2r_1 r_2}\right), & \text{otherwise.} \end{cases} \quad (2a)$$

Now, if there are k sensors on the circle 65, a probability $P[\text{corr}(k)]$ that the sensor at the point 67 is correlated with at least one of these sensors is $$P[\text{corr}(k)] = k \cdot P[\text{corr}(1)], \text{ with } P[\text{corr}(1)] \text{ as in (2a).} \quad (2.1a)$$

Equation (2.1a) is clearly only an approximation. The right hand side is in fact an upper bound to the left hand side. An "exact" equation can, of course, be obtained by using a standard "inclusion-and-exclusion-formula" (and assuming statistically independent sensor locations on the circle 65)

$$P[\text{corr}(k)] = \sum_{n=1}^{k} (-1)^{n+1}\binom{k}{n}P[\text{corr}(1)]^n = 1 - (1 - P[\text{corr}(1)])^k,$$

but this will usually be considered as an unnecessary degree of complication for our purposes.

A formula for calculating a probability that K sensors located on or approximately on a circle of radius r1 are all uncorrelated with each other will now be derived. Given that K−1 of the sensors are all mutually uncorrelated, a probability that the K-th sensor is correlated is given by $$(K-1)\frac{s(r_1, r_1, d_0)}{2\pi r_1} -$$

assuming of course that this value is not greater than one, if this is not the case, the sought probability clearly becomes one. It follows that the sought probability is $$P[K \text{ uncorrelated sensors}] = \prod_{i=1}^{K}\left[1 - (i-1)\frac{s(r_1, r_1, d_0)}{2\pi r_1}\right]. \quad (3a)$$

In particular embodiments of the invention, a cell of the central coordinating node may be divided into N sectors, where N denotes an integer that is greater than one. In such a sectorized cell, correlation with sensors outside of the sector where a particular sensor is located is not considered. For the sectorized cell case, analogues to equations (2a), (2.1a) and (3a) can be found to be $$P[\text{corr}(1)] = \begin{cases} 0 & \text{when } d_0 < \text{abs}(r_1 - r_2) \\ 1 & \text{when } d_0 \geq r_1 + r_2 \\ \frac{N \cdot s(r_1, r_2, d_0)}{2\pi r_2}\left(1 - \frac{N \cdot s(r_1, r_2, d_0)}{8\pi r_2}\right), & \text{otherwise} \end{cases} \quad (2b)$$

$$P[\text{corr}(k)] = k \cdot P[\text{corr}(1)], \text{ with } P[\text{corr}(1)] \text{ as in (2b),} \quad (2.1b)$$

$$P[K \text{ uncorrelated sensors}] = \quad (3b)$$

$$\prod_{i=1}^{K}\left[1 - (i-1)\frac{N \cdot s(r_1, r_1, d_0)}{2\pi r_1}\left(1 - \frac{N \cdot s(r_1, r_1, d_0)}{8\pi r_1}\right)\right]$$

The number of sensors that can be "accommodated" at or approximately equal radius r1 from the central coordinating node is here taken to mean the largest integer K such that P[K uncorrelated sensors]≧T (using either one of (3a) or (3b) depending on the cell case), where T is a first design probability threshold.

According to embodiments of the invention, the candidate set is partitioned into an active and a passive set based on actual radii to the sensors relative to the central coordinating node.

The method takes as its input the candidate set of sensors, where the distances (radii) from the central coordinating node to each candidate sensor is known. Another input to the method is the first design probability threshold T and possibly a second design probability of threshold D (see below).

The method is initialized by setting a next minimum radius r equal to zero, and the number of sensors to pick (at the next minimum radius r) k=1. The variable k is here used as a variable that indicates the number of sensor that can be accommodated at the next minimum radius, the variable k thus indicates an "accommodation number". Setting k=1 is here interpreted such that only one sensor can be accommodated at a radius that is zero. A new next minimum radius will subsequently be calculated, and k will then be updated to indicate the number sensors that can be accommodated at the new next minimum radius. The central coordinating node (BS or master node in an ad hoc network) is then selected as the first node in the active set.

Given initial values of r, k and a value of the second design probability threshold D, a new next minimum radius r' is computed by setting P[corr(k)] (using either (2a) and (2.1a) or (2b) and (2.1b) depending on cell case) equal to D and solving for r1, with r2=r. In a particular embodiment, the second design probability threshold D may be equal to the first design probability threshold T, i.e. only one threshold is used. The value r' is now checked against one or more constraints. One example of such a constraint is a minimum increase in radius between r and r', r'≧r+c, where c can be related to the decorrelation distance d0. Another example of a constraint is that for certain values of the second design probability threshold D, radius r, and decorrelation distance d0, there exist no real solutions for r1 to equations (2.1a) or (2.1b), in which case some parameter, for example, the second design probability threshold D, must be adjusted such that a solution exists. An alternative, however, is to replace equality with an inequality, e.g. to require, instead, that P[corr(k)]<D, then a solution can always be found, and preferably a value of r1 which is as small as possible, but still fulfilling the inequality, should be selected. When a valid value for r', the new next minimum radius, has been found, the method sets r equal to r'. So that r is now the new next minimum radius. The method then computes the number of sensors that can be accommodated at the radius r1=r, using the first design probability threshold T and (3a) for the circular cell scenario and (3b) for the sectorized cell scenario; the variable k is then set to equate this number.

Given updated values of r and k, the method proceeds to selecting the k sensors with smallest radii still greater than r, if k such sensors exist. If k such sensors exist they are selected to the active set and the method returns to the steps of updating r and k as described above.

If less that k sensors with radii greater or equal to r exist in the candidate set, then these sensors are selected and the method is terminated. This also includes the case of zero sensors with valid radii.

This method may optionally terminate when a specified desired value of active sensors has been reached. If no such value is specified then the method below runs without modification. Another option is to run the method without limitation on the number of active sensors and, after termination of the method, if the number of sensors in the active set exceeds the desired value, purge the active set, e.g. by removing the sensor(s) with the smallest radial difference(s).

If it is desirable from a speed and complexity standpoint we can pre-compute the next minimum radius r' given r and the number of sensors k that can be accommodated at r, given the threshold D.

Figure 7:
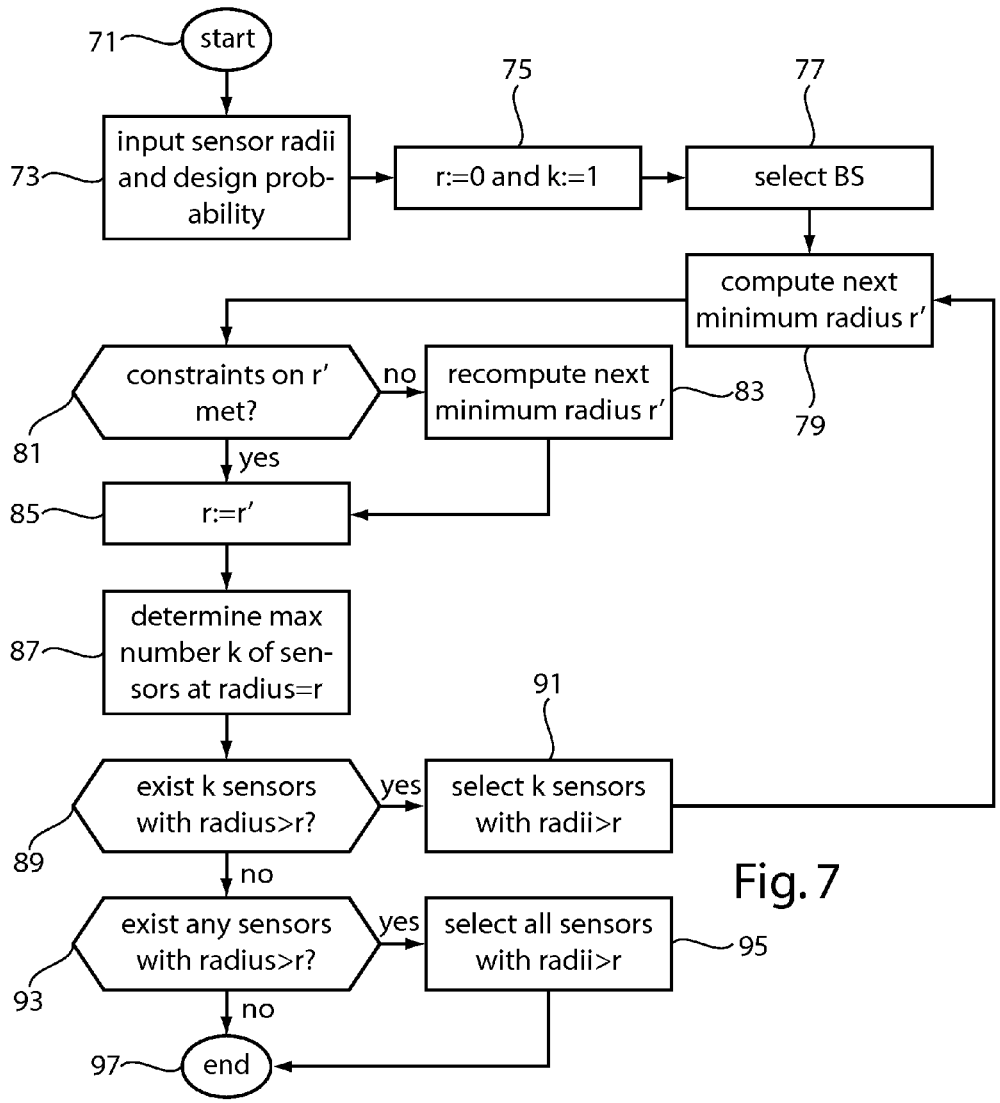
FIG. 7 is a flow chart illustrating a method according to an embodiment of the invention.

FIG. 7 is a flow chart that illustrates a method of sensor selection according to an implementation embodiment of the invention. After a start 71, an input to the method is provided at a block 73. The input includes the candidate set of sensors with associated sensor radii relative to the central coordinating node, here a base station, and the design probability thresholds T and D, or one of these thresholds in an embodiment where they are considered equal. Then, at a block 75, the variable r is set to 0 and the variable k is set to 1. The base station is then selected to the active set at a block 77. At a block 79, the new next minimum radius r' is computed, in the manner explained above. At block 81, a check is made to see whether the computed value r' meets all constraint(s). If not, a recomputed value of r' which meets the constraint(s) is provided at a block 83. Once there exists a value of r' which is consistent with the constraint(s), r is set equal to r' at a block 85. So that r is now the new next minimum radius. The number of sensors that can be accommodated, in the above-defined sense, at a circle of radius r is then determined at a block 87, and the variable k is set to equal this value. Then, at a block 89, it is checked whether the candidate set contains k sensors with radii to the central coordinating node which are greater than r. If this is the case, the k sensors with smallest radii still greater than r are picked from the candidate set to the active set. Thereafter, the method returns to the block 79, and the method is repeated as described. If, however, there does not exist k sensors with radii greater than r, then any sensors with radii greater than r are added to the active set by virtue of blocks 93 and 95, and the method ends at a block 97.

Above, the invention has been illustrated with various embodiments. These embodiments are, however, intended only as non-limiting examples, and the scope of protection is instead defined by the appending claims.

The invention claimed is:

1. A method relating to cooperative spectrum sensing, the method comprising:
   obtaining a candidate set of sensors that are available to participate in the cooperative spectrum and for each sensor in the candidate set its radial distance to a central coordinating node in a communication system;
   initiating a next minimum radius to zero;
   setting a number of sensors that can be accommodated at the initiated next minimum radius equal to one;
   selecting the central coordinating node to an active set of sensors to participate in the cooperative spectrum sensing;
   a) calculating a new next minimum radius such that an estimated probability of a sensor at the new next minimum radius from the central coordinating node being correlated with any sensor that could be accommodated at the previous next minimum radius is equal to a second design probability threshold;
   b) checking whether or not the new next minimum radius meets one or more predetermined constraints and, if not, recalculating the new next minimum radius such that it meets the one or more constraints;
   c) determining a number of sensors that can be accommodated at the new next minimum radius, said number of sensors being the greatest integer such that a probability that such an integer number of sensors at the new next minimum radius do not experience any mutual shadowing correlation is greater than or equal to a first design probability threshold;
   d) if the candidate set includes a number, equal to or greater than the determined number of sensors that can be accommodated at the new next minimum radius, of sensors which all have radial distances to the central coordinating node that exceed the new next minimum radius, selecting to the active set a number, equal to the determined number of sensors that can be accommodated at the new next minimum radius, of sensors which have the smallest radial distances to the central coordinating node that still exceed the new next minimum radius;
   e) if the candidate set does not include a number, equal to or greater than the determined number of sensors that can be accommodated at the new next minimum radius, of sensors which all have radial distances to the central coordinating node that exceed the new next minimum radius, selecting to the active set every, if any, sensor in the candidate set which has a radial distance to the central coordinating node greater than the new next minimum radius and terminating the selection of sensors to the active set; and
   f) if the selection of sensors to the active set has not terminated, repeating the steps a) to f).

2. The method according to claim 1, wherein the method further comprises terminating the selection of sensors to the active set whenever a size of the active set reaches a predetermined desired value.

3. The method according to claim 1, wherein the method further comprises, once the selection of sensors to the active set has terminated, purging the active set if a size of the active set exceeds a predetermined desired value.

4. The method according claim 1, wherein the step of calculating the new next minimum radius comprises taking into account whether the cell is a circular cell or sectorized cell.

5. The method according to claim 1, wherein the first design probability threshold and the second design probability threshold are one and the same.

6. The method according to claim 1, wherein the step b) comprises checking that the calculated new next minimum radius exceeds a previous next minimum radius by at least a predetermined amount.

7. The method according to claim 1, wherein the step b) comprises checking whether the calculated new next minimum radius is a real value and, if not, adjusting the second design probability threshold such that a real valued new next minimum radius can be calculated.

8. The method according to claim 1, wherein the step b) instead comprises calculating a new next minimum radius such that an estimated probability of a sensor at the new next minimum radius from the central coordinating node is correlated with any sensor selected to the active set at a previous next minimum radius is less than or equal to a second design probability threshold.

9. The method according to claim 1, wherein the steps a) to d) are performed as pre-computations a result of which is stored in a memory for subsequent use.

10. The method according to claim 1, wherein the method is performed in the central coordinating node.

11. The method according to claim 1, wherein the central coordinating node is a base station.

12. An element for sensor selection characterised in that it is configured to perform a method according to claim 1.

13. An element for sensor selection characterised in that it is configured to perform the steps of:
  obtaining a candidate set of sensors that are available to participate in the cooperative spectrum and for each sensor in the candidate set its radial distance to a central coordinating node in a communication system;
  initiating a next minimum radius to zero;
  setting a number of sensors that can be accommodated at the initiated next minimum radius equal to one;
  selecting the central coordinating node to an active set of sensors to participate in the cooperative spectrum sensing;
  a) calculating a new next minimum radius such that an estimated probability of a sensor at the new next minimum radius from the central coordinating node being correlated with any sensor that could be accommodated at the previous next minimum radius is equal to a second design probability threshold;
  b) checking whether or not the new next minimum radius meets one or more predetermined constraints and, if not, recalculating the new next minimum radius such that it meets the one or more constraints;
  c) determining a number of sensors that can be accommodated at the new next minimum radius, said number of sensors being the greatest integer such that a probability that such an integer number of sensors at the new next minimum radius do not experience any mutual shadowing correlation is greater than or equal to a first design probability threshold;
  d) if the candidate set includes a number, equal to or greater than the determined number of sensors that can be accommodated at the new next minimum radius, of sensors which all have radial distances to the central coordinating node that exceed the new next minimum radius, selecting to the active set a number, equal to the determined number of sensors that can be accommodated at the new next minimum radius, of sensors which have the smallest radial distances to the central coordinating node that still exceed the new next minimum radius;
  e) if the candidate set does not include a number, equal to or greater than the determined number of sensors that can be accommodated at the new next minimum radius, of sensors which all have radial distances to the central coordinating node that exceed the new next minimum radius, selecting to the active set every, if any, sensor in the candidate set which has a radial distance to the central coordinating node greater than the new next minimum radius and terminating the selection of sensors to the active set; and
  f) if the selection of sensors to the active set has not terminated, repeating the steps a) to f).

\* \* \* \* \*

UNITED STATES PATENT AND TRADEMARK OFFICE
CERTIFICATE OF CORRECTION

| | | |
|---|---|---|
| PATENT NO. | : 8,270,906 B2 | Page 1 of 1 |
| APPLICATION NO. | : 12/993555 | |
| DATED | : September 18, 2012 | |
| INVENTOR(S) | : Selén et al. | |

It is certified that error appears in the above-identified patent and that said Letters Patent is hereby corrected as shown below:

On the Cover Page, item (12), under "United States Patent", in Column 1, Line 1, and item (75) under "Inventors", in Column 1, Line 1, delete "Selen" and insert -- Selén --, therefor.

On the Cover Page, item (75), under "Inventors", in Column 1, Line 3, delete "Nykoping" and insert -- Nyköping --, therefor.

Signed and Sealed this
Twenty-second Day of January, 2013

David J. Kappos
*Director of the United States Patent and Trademark Office*